June 23, 1936.  H. J. KUHLMAN  2,045,394
RAKE
Filed June 22, 1934

Inventor,
Henry J. Kuhlman, by
G. C. Kennedy, Attorney

Patented June 23, 1936

2,045,394

UNITED STATES PATENT OFFICE 2,045,394

RAKE

Henry J. Kuhlman, Oskaloosa, Iowa

Application June 22, 1934, Serial No. 731,807

3 Claims. (Cl. 55—10)

My invention relates to improvements in rakes, and an object of my improvements is to supply a device of this class with a head having oppositely directed teeth having a common tread, and of a desired plurality wherein the sets of said teeth are spaced laterally and depend wholly below the under face of the head, for improved clearance therebetween in use.

Another object of my improvements is to shape each of said sets of oppositely projecting teeth with lateral longitudinal offset shoulders along the upper parts of their side walls, as abutments and supports for the teeth while riding upon soil or excavating it.

Another object of my improvements is to shape each of said sets of oppositely projecting teeth with a common tread face and having different lengths and upward curvatures of their outer terminations, to permit the teeth on one side of the head to be used for excavating purposes, and the teeth on the other side to be used in one position of the head to rake the earth close to an obstructing body.

Another object of my improvements is to mount a handle or the like upon the rake head at such an angle relative to said sets of teeth, that the opposite ones of each set may be employed particularly for such different uses as mentioned hereinabove.

Figure 1:
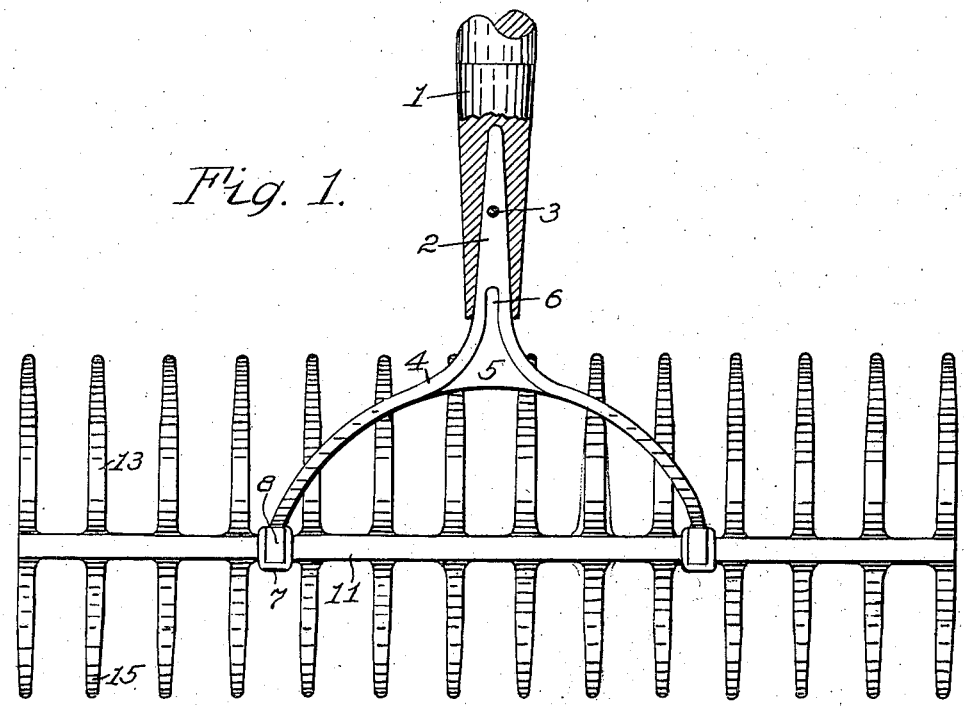
Figure 2:
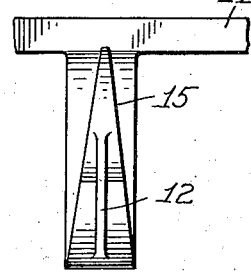
Figure 5:
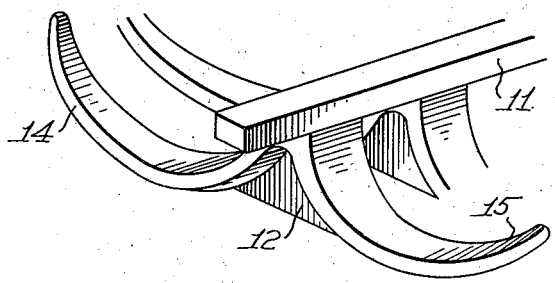
Figures 3, 4:
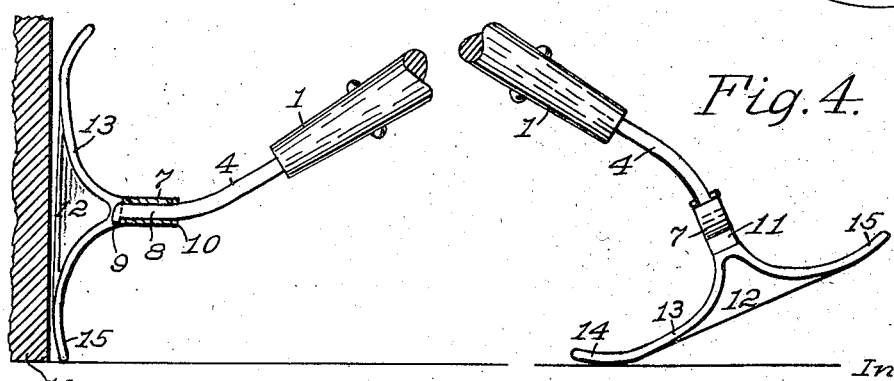

I have successfully achieved said objects in actual reduction to practice by the means which are hereinafter described and claimed, and which are illustrated in the accompanying drawing, in which Fig. 1 is a top plan of my improved rake, with a portion of the handle removed and another part sectioned longitudinally. Fig. 2 is a rear elevation of one of the rake teeth shown in said Fig. 1 and Fig. 4, and looking toward the rake in the position of Fig. 4 taken from right to left. Figs. 3 and 4 are side elevations of one set of the oppositely directed teeth, placed in angular positions such as are proper for their respective uses as above mentioned, and with removal of parts of the handle and in Fig. 3 with a section of the head showing the means for securing an arm of the fork thereto. Fig. 5 is a perspective detail of a portion of the rake head, showing one tooth set thereof.

My rake is illustrated as made for manual employment, but it is obvious that it may be mounted for power actuation in any desired way, without departing from my invention or from the protection of the appended claims.

The rake comprises an elongated handle 1 and a toothed head bar 11, connected by means of a forked element 4 having a shank 2 inserted in an end hollow 6 of the handle and secured therein rigidly by a rivet 3 or any other suitable fastening means. As the fork 4 has widely spread curvate arms they are integrally connected by a web 5 at their angle of approach. The handle 1 is preferably set at an angle to one side of the head 11 by a bend in said fork arms best shown in said Figs. 3 and 4.

The head 11 and its teeth are preferably a single casting, as of malleable iron or other suitable material, but may be otherwise constructed and connected as found desirable for economy and efficient use. The teeth are of any desired plurality spaced apart along the head 11, and depend therefrom, which cause adjacent sets of teeth to be separated laterally by an interspace which extends upwardly completely to the head, without any interposed connections between the sets of teeth in said interspace which might be obstructive to the free passage of the teeth about stalks or the like, or on the other hand might prevent clearance of such sets of teeth beneath the head for material being raked or which may have adhered to the teeth in any position of their employment.

The method of securing the outer ends of the fork arms 4 to the head 11 is shown in said Fig. 3, where the head is shown in cross section and as perforated to receive the termination of one arm 4 therethrough at 8, where the numeral 9 denotes an offset end of the arm stopped against the abutting part of the head, and where the numeral 10 denotes a stop pin passed through a hole in the arm to serve as a stop against the top face of the head.

Each set of teeth, which are oppositely directed, are as shown in Figs. 3 and 4, provided with a medially straight common tread which curves slightly upwardly at their opposite outer terminations 14 and 15, and in practice these opposite teeth 14 and 15 are of slightly different lengths and curvatures, but each of such sets of teeth are thus provided with a tread shape tilted curvilinearly upwardly toward its ends, sled-like.

In Fig. 3 the handle is shown as in use inclinedly for ease of use by the operator, and in a position where the head 11 is turned with the teeth of each set substantially vertical, as where the shorter teeth 15 are in a suitable position for raking close to an obstruction, such as a wall 16, or while dragging material or digging into soil to be loosened. The same easy position of the handle 1 for use is shown in Fig. 4, where the sled-runner tread of the other teeth 14 of each set may ride easily upon the earth as in gathering cut grass, brush or other loose materials, and the upcurved ends 14 do not catch in obstructions but ride flatly over a surface traversed.

The construction shown not only permits different uses for the one tool, but renders it inexpensive relatively to such uses, and of a simple integral body having no connected elements liable to become loose or break apart under the stresses of use.

It will be noted that each set of opposite teeth has a common web connection 12 which narrows upwardly toward the head, as shown in Figs. 3 and 4 and this renders the teeth of great strength to resist the many positions and varieties of their uses.

I claim:

1. A rake having a head with a plurality of sets of integral teeth extending oppositely from each other, and with each set of opposite teeth having a thinner connecting web providing a common tread therebetween.

2. A rake having a head with a plurality of sets of integral teeth extending oppositely from each other, and with each set of opposite teeth having a common web providing a common tread therebetween, a handle and a rigid connection between the head and the handle by which the sets of teeth along one face of the head are directed from the handle at a less angle than the sets of teeth along the opposite face are directed therefrom.

3. A rake having a handle and a transverse head fixed terminally thereon, the head having sets of spaced oppositely directed integral teeth connected by webs providing common treads, the tops of the teeth being wider than the webs, and the teeth along opposite faces of the head being directed therefrom to be respectively projecting at different angles relative to the handle.

HENRY J. KUHLMAN.